(12) United States Patent
Yamai

(10) Patent No.: US 7,742,033 B2
(45) Date of Patent: Jun. 22, 2010

(54) BACKLIGHT CONTROL SYSTEM FOR SMALL SIZE DISPLAY, LCD PANEL THEREFOR, AND METHOD FOR MAKING BACKLIGHT CONTROL SYSTEM

(75) Inventor: Masatoshi Yamai, Musashino (JP)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1151 days.

(21) Appl. No.: 11/364,729

(22) Filed: Feb. 28, 2006

(65) Prior Publication Data
US 2006/0215099 A1  Sep. 28, 2006

(30) Foreign Application Priority Data
Mar. 2, 2005  (JP) .............................. 2005-057334

(51) Int. Cl.
G09G 3/36 (2006.01)
(52) U.S. Cl. ........................... 345/102; 345/55; 345/204
(58) Field of Classification Search ................. 345/102, 345/55, 204
See application file for complete search history.

(56) References Cited

U.S. PATENT DOCUMENTS 5,854,617 A   12/1998   Lee

2005/0231457 A1 *  10/2005  Yamamoto et al. .......... 345/102
2006/0215099 A1    9/2006  Yamai

FOREIGN PATENT DOCUMENTS

| JP | 58-170053   | 10/1983 |
|----|-------------|---------|
| JP | 8-76096     | 3/1996  |
| JP | 2001-92414  | 4/2001  |
| JP | 2001-332764 | 11/2001 |
| JP | 2002-533870 | 10/2002 |
| JP | 2004-29141  | 1/2004  |
| JP | 2004-170721 | 6/2004  |

* cited by examiner

*Primary Examiner*—Richard Hjerpe
*Assistant Examiner*—Leonid Shapiro

(57) ABSTRACT

A backlight control system has a light source controlled by a control device; a light guide for introducing light from light source and supplying backlight from the back surface of liquid crystal panel; a light sensor for detecting part of the backlight; and means for feeding signals from light sensor back to control device. Liquid crystal panel comprises light sensor on the side of the glass substrate thereof opposite the side where drive elements are mounted. Light sensor detects light from the base side that has passed through glass substrate on the surface of glass substrate.

8 Claims, 1 Drawing Sheet

BACKLIGHT CONTROL SYSTEM FOR SMALL SIZE DISPLAY, LCD PANEL THEREFOR, AND METHOD FOR MAKING BACKLIGHT CONTROL SYSTEM

BACKGROUND OF THE INVENTION

1. Field of the Invention

The present invention relates to a system for controlling backlight that is used together with a liquid crystal display panel, and in particular, relates to a system that is used for small displays.

2. Description of Related Art

Backlight modules that use a compound semiconductor light-emitting element such as a light-emitting diode in place of a fluorescent tube have become popular in recent years. Such a module normally uses light-emitting diodes of three colors, red (R), green (G), and blue (B). Mixtures of these colors are introduced into a light guide member disposed at the back surface of a liquid crystal panel. The light guide member supplies illuminating light from the back surface side of the liquid crystal display surface. Backlight modules wherein light-emitting diodes serve as the light source have advantages, including the fact that color reproducibility is better than that obtained when a fluorescent tube is used, and the use of these backlight modules promises to increase.

Many control systems for such backlight modules comprise a feedback mechanism. That is, the intensity of each component for each color of mixtures of the red, green, and blue light that form the backlight is detected by a light sensor or detector. The intensity signals of each color that has been detected are fed back to a control circuit for controlling the light emission from each of the light-emitting diodes. The control system applies a predetermined compensation to the emission intensity of each light-emitting diode based on reference signals that are set by the user or that have been initially set. The theory behind this type of system is, for instance, described in JP National Publication of International Application (Kohyo) 2002-533,870; Unexamined Japanese Patent Application (Kokai) 2001-92,414; Unexamined Japanese Patent Application (Kokai) 2001-332,764; and Unexamined Japanese Patent Application (Kokai) 2004-29,141

By means of this type of system, the light sensor can be disposed adjacent to the light-emitting diode, but it is preferred that light be detected near the liquid crystal panel module. In the latter case, a light sensor for backlight in a conventional, relatively large display is disposed joined with the light guide member such that light can be efficiently received. Similar technology is described in Unexamined Japanese Patent Application (Kokai) 2004-170,721.

The above-mentioned system must be such that it can also be used in relatively small backlight modules. Nevertheless, in this case, the light guide member for introducing backlight that is disposed on the back surface of the liquid crystal module is as thick as 1 mm. Consequently, the light sensor cannot be disposed with stability on the side end face of the light guide member. Furthermore, even if it is temporarily disposed at the side end face, the light guide is thin in comparison to the light-receiving part and light therefore cannot be introduced to the light sensor efficiently, or the structure becomes one where the light sensor projects from the light guide to the base side and it therefore does not satisfy the requirement of miniaturization.

Therefore, an object of the present invention is to provide an improved structure for a backlight module control system that can even be used for small, thin display devices.

SUMMARY OF THE INVENTION

By means of the present invention, a light sensor for detecting light from a light source is a COG (chip-on-glass) mounted on a glass substrate that forms a liquid crystal panel, and the light that has passed through the light guide member on the back surface of the liquid crystal panel and the glass substrate of the liquid crystal panel is detected by the light sensor and used for feedback control.

The backlight control system provided by the present invention is a system comprising a light source having a light-emitting device for emitting light of multiple, different wavelengths that is controlled by a control device; a light guide for introducing light from this light source and feeding backlight from the back surface of the liquid crystal panel; a light sensor for sensing the components of the backlight with multiple, different wavelengths; and means for feeding the signals of the light sensor back to the control device; and has a light sensor that is mounted, together with drive elements that drive the liquid crystal panel, on the top surface of the glass substrate on the base side on the side opposite the end where the drive elements are mounted sandwiching the liquid crystal display surface. The light sensor is constructed such that it detects, on the surface of the glass substrate, the light from the back surface side that has been introduced into the light guide disposed at one end of the back surface of the liquid crystal panel where the drive elements are mounted and has passed through this light guide and glass substrate.

The light source has multiple light-emitting diodes for emitting light of at least three colors with difference wavelengths, typically red, green, and blue, and means for mixing the light from the multiple light-emitting diodes. In this case, the light sensor is capable of differentiating and individually sensing or detecting light of various wavelengths, and the control device comprises means for individually controlling the emission of light from each of the multiple light-emitting diodes.

A light-blocking mask is formed on the panel surface on the base side of the glass substrate opposite the surface where the light sensor is mounted and a window for aligning with the light sensor and introducing light can be formed.

The steps for producing a backlight control system consist of a step for producing a liquid crystal panel, which includes a process for mounting the drive circuits for driving the liquid crystals on a glass substrate; a step for disposing a light guide for supplying backlight on the back surface of the liquid crystal panel; a step for optically joining the light source with the light guide; and a step for disposing the light sensor for detecting some of the light that serves as the background light near the light guide and feeding the detection signals of the light sensor back to the control circuit of the light source; and the step for disposing the light sensor also includes a process for mounting the light sensor on the glass substrate of the liquid crystal display panel.

The process for mounting the light sensor on the glass substrate can be performed once the liquid crystal panel has been completed, but it can also be performed in combination with the process for mounting the drive circuits on the glass substrate during the course of producing the liquid crystal panel.

The step for producing a liquid crystal panel also includes a process for forming a light-blocking mask on the panel surface opposite the side on which the light sensor is mounted. A process is included for forming a window for introducing to the light sensor some of the light from the light source when the system is completed.

The present invention is capable of accommodating device specifications, even when the dimensions of the space that the liquid crystal panel and light guide can occupy must be relatively small in relation to thickness. Moreover, even with this embodiment, it is possible to guarantee stable operating performance in terms of light detection by the light sensor and to maintain high performance in terms of reliability of backlight control by feedback. A simplification of the production process by simultaneously mounting the light sensor with the other drive circuits can also be anticipated.

DETAILED DESCRIPTION OF THE PREFERRED EMBODIMENT

The backlight control system and the method for producing a system, including a liquid crystal panel, which are the preferred embodiments of the present invention, will now be described in detail while referring to the attached drawings.

Figure 1:
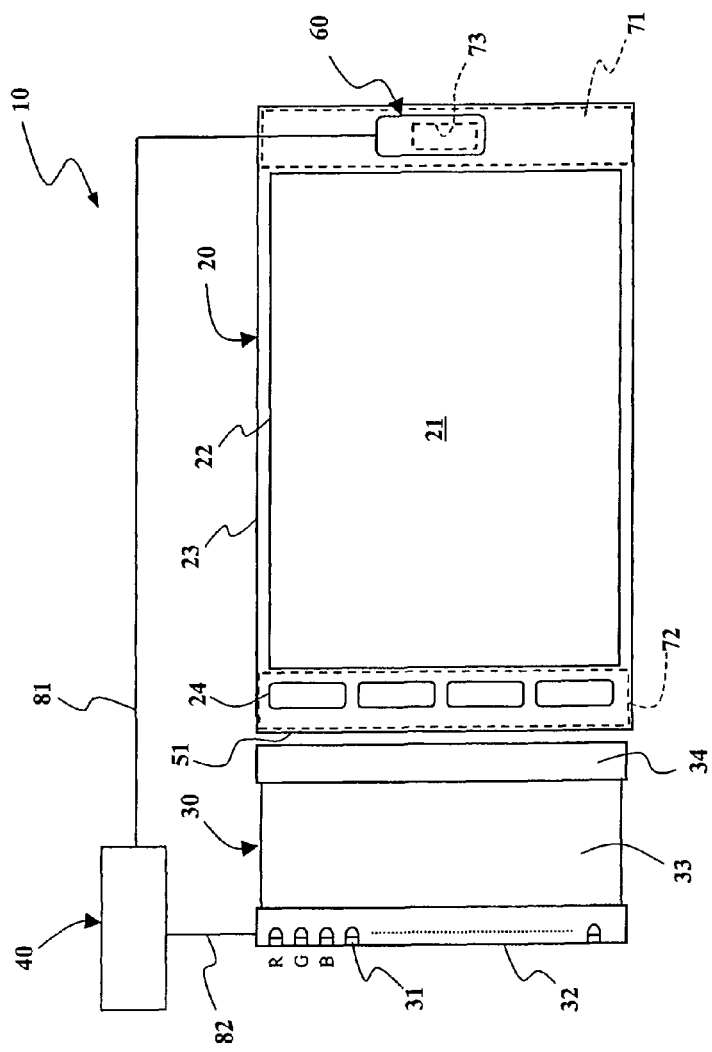
FIG. 1 is a drawing showing the entire system of the present invention with a plan of the liquid crystal panel.
Figure 2:
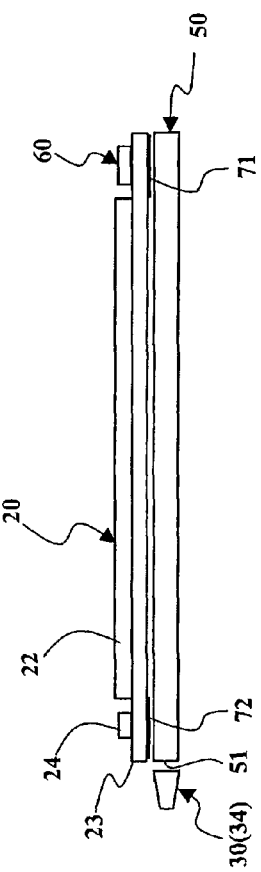
FIG. 2 is a side view showing the structure in the direction of height of the liquid crystal panel and the light guide that supplies backlight.

FIG. 1 is a drawing showing the entire system of the present invention with a plan of the liquid crystal panel. FIG. 2 is a side view showing the structure in the direction of height of the liquid crystal panel and the light guide that supplies backlight.

A backlight control system 10 comprises a liquid crystal panel 20; a light guide 50 disposed on the back surface of the panel; a light source 30 for supplying light to light guide 50; and a control device 40 of light source 30. The output light from light source 30 is introduced to light guide 50 and on one end 51 thereof. Although not illustrated, light guide 50 has approximately the same dimensions in terms of width as liquid panel 20. As a result, white or any color of light is supplied from the back of liquid crystal panel 20 over at least the entire surface of a display 21 of liquid crystal panel 20.

Light source 30 has a light-emitting part 32 in which an array of multiple light-emitting devices 31 are disposed, a light mixing part 33 disposed further behind the light-emitting part, and a light output part 34 that is optically joined with one end 51 of light guide 50. Multiple light-emitting devices 31 can constitute a light-emitting diode device that emits light of different wavelengths. For instance, a device that emits light in three different colors of red (R), green (G), and blue (G) (that is, light of each different color region) can be used as the light-emitting diode device. These light-emitting devices 31 are disposed such that they form an array in order based on constant regularity of these emitted colors, for instance, in the direction of width.

Color mixing part (or mixer) 33 has the function of mixing the light of these different colors or wavelengths. For instance, if the balance in emission intensity from the red, green, and blue emission devices is normalized using a control device 40 that is described below, light that is apparently white can be supplied to light guide 50 by mixing the light with light mixing part 33. By means of this embodiment, light-mixing part 33 is shown with straight lines, but the light can be mixed using a curved light path that has been made with mirrors, and the like.

Control device 40 has the function of controlling the emission intensity of each light-emitting device 31 in light source 30. That is, control device 40 has the function of controlling the light intensity of each light-emitting device 31 in light source 30 individually or for each light-emitting device 31 of each emission color or emission wavelength. The control signals are supplied to light source 30 by means of a line 82. The control specifications of control device 40 can be supplied from the outside by means of an appropriate user interface, which is not illustrated, or they can also be automatically controlled by the feedback mechanism that is described below.

Liquid crystal panel 20 that is disposed on top of light guide 50 comprises glass panels 22 and 23 in which liquid crystals have been sealed. Base panel 23 is larger in surface area than top panel 22, and the liquid crystal display surface 21 is formed in the center. IC chips (or drive elements) 24 for driving the liquid crystals are disposed at one end of panel 23 on the base side. By means of the present embodiment, IC chips 24 constitute COGs mounted on the panel surface of panel 23 on the base side. The side where the IC chips are mounted and the side where light is introduced from light source 30 can be the same end relative to light crystal panel 20.

A light-blocking mask 72 is formed on the surface on the base side opposite the surface where IC chips 24 are mounted. Light-blocking mask 72 is employed for preventing light from accidentally penetrating display surface 21, and provides means for blocking light from the entire back surface where the drive circuits are mounted. Light-blocking mask 72 can be, for instance, light-blocking tape made of resin, or it can be formed by printing over part of the base surface of panel 23 on the base side.

A light sensor 60 is disposed at the end opposite the side where IC chips 24 are mounted sandwiching display surface 21 of liquid crystal panel 20. Light sensor 60 stabilizes the properties of the backlight and detects part of the backlight by color or wavelength. The intensity signals of each detected color or wavelength are fed back through a line 81 to control device 40.

Control device 40 changes the intensity of light-emitting device 31 of light source 30 based on the detection signals of light sensor 60. For instance, when supplying white backlight, it is possible to retain a stable white color by adjusting the emission intensity of light-emitting device 31 that emits this color so that it is relatively high when the intensity of one component of the emission colors is relatively small as a result of changes over time. Changes in the color of the backlight have a direct effect on the color reproducibility of a liquid crystal display device, and the above-mentioned function is therefore very important.

By means of the present embodiment, light sensor 60 is a COG mounted on panel 23 on the base side as with above-mentioned drive circuit 24. The same light-blocking mask 71 as disposed on the back surface of drive element 24 is formed on the surface of the base side opposite the side where light sensor 60 is mounted, but a window 73 is formed on the interior side of this light-blocking mask 71 such that some of the light from light guide 50 can reach light sensor 60. That is, light sensor 60 receives light that has been introduced from the base side to base panel 23 through window 73 and detects this light. Consequently, light sensor 60 is mounted on panel 23 on the base side so that the light-detecting part thereof faces the base side.

The preferred embodiment of backlight control system 10 of the present invention is realized by producing liquid crystal panel 20, light source 30, and control device 40 separately and assembling these, including lines 81, 82, etc. Light sensor 60 can be mounted when the production of liquid crystal panel 20 is completed and assembled with the other devices, or it can be performed during the same process when liquid crystal panel 20 is being produced. The latter case has an advantage in terms of process simplification. A step for forming above-mentioned light-blocking masks 71 and 72 is also performed during the production of liquid crystal panel 20.

The overall dimensions, including light sensor 60, can be reduced relative to thickness by the structure of the present embodiment. Consequently, there is the advantage in that this structure can be used, even when the light guide must be relatively thin in order to be used, for instance, in small portable devices.

The preferred embodiment of the backlight control system of the present invention was described in detail above, but this is only an example and in no way limits the present invention. Various modifications by persons skilled in the art are possible.

What is claimed is:

1. A backlight control system comprising:
   a liquid crystal panel comprising a top panel attached to a base panel;
   said top panel comprising a top panel first surface, an oppositely disposed top panel second surface and a liquid crystal display surface visible from said top panel first surface;
   said base panel comprising a base panel first surface and an oppositely disposed base panel second surface;
   wherein said top panel second surface is adjacent said base panel first surface;
   a light source having a light-emitting device for emitting light of multiple, different wavelengths that is controlled by a control device;
   a light guide adapted to receive light from the light source and supply backlight through the base panel second surface of the liquid crystal panel;
   a light sensor adapted to sense light emitted from said light source and feed signals to the control device;
   drive elements adapted to drive the liquid crystal panel;
   wherein, said light sensor and said drive elements are mounted on said base panel first surface sandwiching said top panel therebetween; and
   a light-blocking mask formed on the base surface of the glass substrate opposite the position where the light sensor is mounted and a window through which some of the backlight is capable of passing is formed on the interior side of the light-blocking mask.

2. The backlight control system according to claim 1, wherein said light source comprises multiple light-emitting diodes for emitting light of at least three colors with different wavelengths, and a means for mixing the light from the multiple light-emitting diodes;
   said light sensor differentiates and individually detects light of various wavelengths; and
   said control device controls the emission of light from each of the multiple light-emitting diodes.

3. The backlight control system according to claim 2, wherein said multiple light-emitting diodes are at least one diode selected from the group consisting of: red light emitting diodes, green light emitting diodes and blue light emitting diodes.

4. The backlight control system according to claim 1, wherein said light source is optically joined with the side end face of the light guide on the side corresponding to the side where the drive elements are mounted on the liquid crystal display panel.

5. A liquid crystal panel formed by joining glass substrates together, said liquid crystal panel is constructed such that IC chips that serve as drive circuits are formed along one side of the top surface of the glass substrate on the base side and a light sensor capable of sensing each wavelength of light of multiple, different wavelengths is mounted along the other side sandwiching the liquid crystal display surface such that the light sensor is capable of sensing light that has been introduced from the back surface through the glass substrate surface.

6. The liquid crystal panel according to claim 5, further comprising a light-blocking mask disposed on the base surface of the glass substrate opposite the position where the light sensor is mounted and a window through which some of the backlight is capable of passing is disposed on the interior side of the light-blocking mask.

7. A method for producing a backlight control system comprising:
   producing a liquid crystal panel, which comprises a process for mounting the drive circuits for driving the liquid crystals on a glass substrate;
   disposing a light guide for supplying backlight on the back surface of the liquid crystal panel;
   optically joining the light source with the light guide;
   disposing the light sensor for detecting some of the light that serves as the background light near the light guide and feeding detection signals of the light sensor back to the control circuit of the light source, said step for disposing the light sensor comprises a process for mounting the light sensor on the glass substrate of the liquid crystal display panel; and
   wherein said step for producing a liquid crystal panel further comprises a process for forming a light-blocking mask on the back surface of the glass substrate opposite the surface on which the light sensor is mounted and forming a window through which some of the light is introduced to the interior side of the light-blocking mask.

8. The method for producing a backlight control system according to claim 7, wherein said process for mounting the light sensor on the glass substrate is performed in combination with said process for mounting the drive circuits on the glass substrate.

\* \* \* \* \*